(12) United States Patent
Carter

(10) Patent No.: US 7,827,906 B1
(45) Date of Patent: Nov. 9, 2010

(54) DEEP FRYER COOKING APPARATUS

(76) Inventor: Kenneth Carter, 1429 Grantling St., Thomaston, GA (US) 30286

( * ) Notice: Subject to any disclaimer, the term of this patent is extended or adjusted under 35 U.S.C. 154(b) by 584 days.

(21) Appl. No.: 11/690,488

(22) Filed: Mar. 23, 2007

(51) Int. Cl.
*A23L 3/00* (2006.01)

(52) U.S. Cl. ...................................................... 99/367

(58) Field of Classification Search ................. 219/415, 219/428, 429, 432, 433, 434, 435; 126/25 A, 126/38, 387, 40 R, 43, 373, 363, 377, 215; 99/415, 428, 429, 432, 433, 434, 435
See application file for complete search history.

(56) References Cited

U.S. PATENT DOCUMENTS

| | | | | |
|---|---|---|---|---|
| 3,960,137 | A | * | 6/1976 | Schmid .................... 126/387.1 |
| 4,397,299 | A | | 8/1983 | Taylor et al. |
| 4,688,549 | A | * | 8/1987 | Blankemeyer et al. ... 126/373.1 |
| 4,913,041 | A | | 4/1990 | Taber et al. |
| 5,253,566 | A | | 10/1993 | McCabe et al. |
| 5,740,720 | A | * | 4/1998 | Marsh .......................... 99/330 |
| D444,666 | S | | 7/2001 | Kalina et al. |
| 6,405,738 | B1 | * | 6/2002 | Clark et al. ............. 134/115 R |
| 6,900,415 | B1 | * | 5/2005 | Roach et al. ................. 219/433 |
| 2001/0032856 | A1 | * | 10/2001 | Casey ....................... 220/573.1 |
| 2006/0272633 | A1 | * | 12/2006 | Osias, Jr. .................. 126/383.1 |

* cited by examiner

*Primary Examiner*—Tu B Hoang
*Assistant Examiner*—Thien Tran

(57) ABSTRACT

A deep fryer cooking apparatus includes a base that has an upper end and a lower end. A container c has a bottom wall and a perimeter wall that is attached to and extends upwardly from the bottom wall. The container is positioned on the upper end of the base. A plurality of dividing walls is attached to the bottom and perimeter walls and vertically extends from the bottom wall to a position adjacent to a top edge of the perimeter wall. The dividing walls divide the container into a plurality of compartments. A heating assembly is attached to the base to selectively heat the container. A plurality of mesh baskets each has a size and shape approximately conforming to a size and shape of one of the compartments. Each of the mesh baskets includes a grip for removal of the mesh baskets from a respective one of the compartments.

19 Claims, 4 Drawing Sheets

DEEP FRYER COOKING APPARATUS

BACKGROUND OF THE INVENTION

1. Field of the Invention

The present invention relates to oil cooking devices and more particularly pertains to a new oil cooking device for allowing multiple food items to be prepared simultaneously in a deep fryer without contamination between the different food items.

2. Description of the Prior Art

The use of oil cooking devices is known in the prior art. While these devices fulfill their respective, particular objectives and requirements, the need remains for a device that allows a person to cook a plurality of food items at the same time wherein the food items are separated from each other. Further, the device should include means for allowing the heating of separate compartments of the device using only one heat emitter to increase efficiency of the use of the device.

SUMMARY OF THE INVENTION

The present invention meets the needs presented above by generally comprising a base that has an upper end and a lower end. The lower end is positionable on a support surface. A container configured to receive oil for deep frying has a bottom wall and a perimeter wall that is attached to and extends upwardly from the bottom wall. The container is positioned on the upper end of the base. The bottom wall has a convex shape extending downwardly from the peripheral wall. A plurality of dividing walls is attached to the bottom and perimeter walls and vertically extends from the bottom wall to a position adjacent to a top edge of the perimeter wall. The dividing walls divide the container into a plurality of compartments. A heating assembly is attached to the base and is configured to selectively heat the container. A plurality of mesh baskets for removing cooked items of food from the container each has a size and shape approximately conforming to a size and shape of one of the compartments. Each of the mesh baskets includes a grip to facilitate removal of the mesh baskets from a respective one of the compartments.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
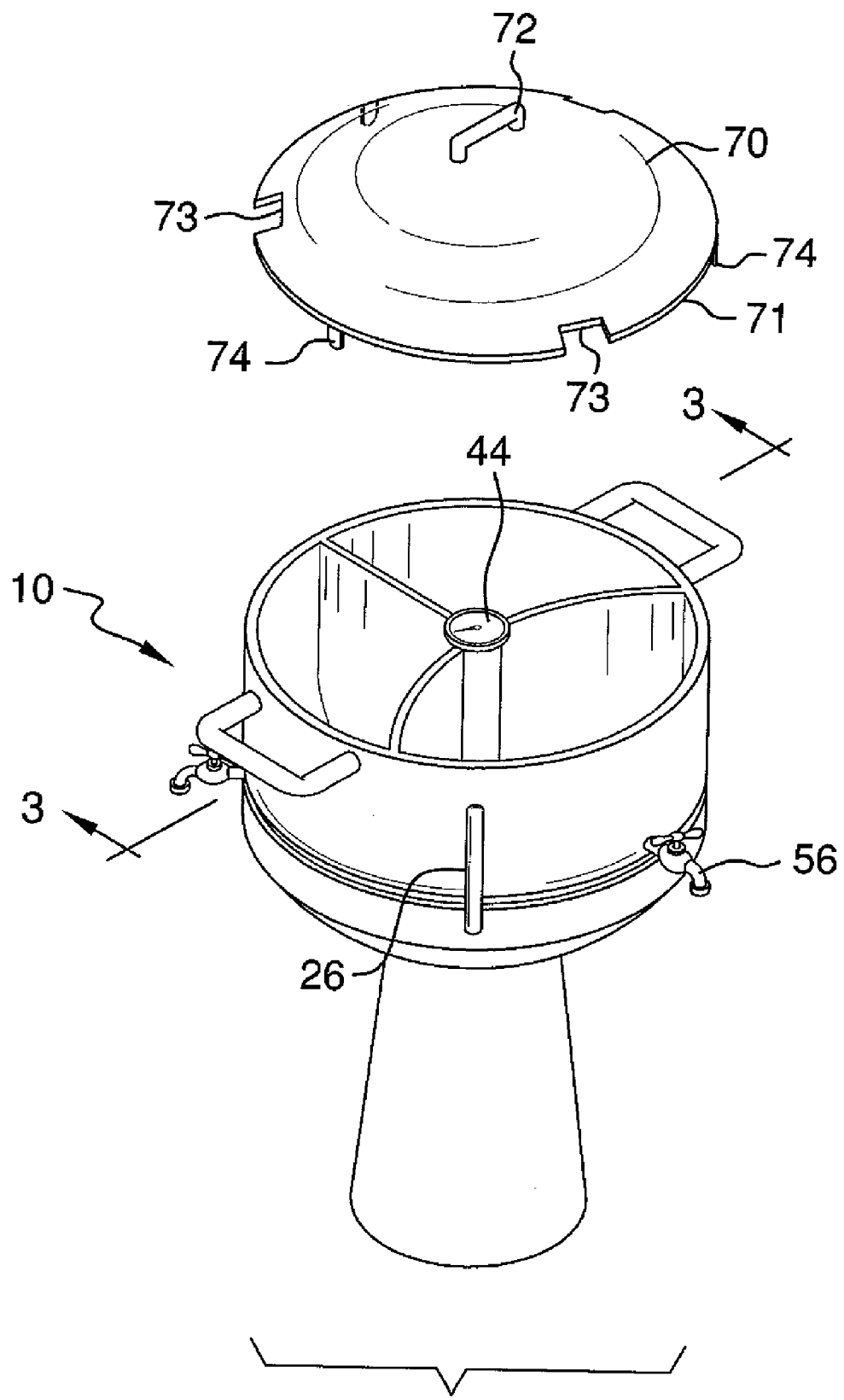
FIG. 1 is a perspective view of a deep fryer cooking apparatus according to the present invention.
Figure 2:
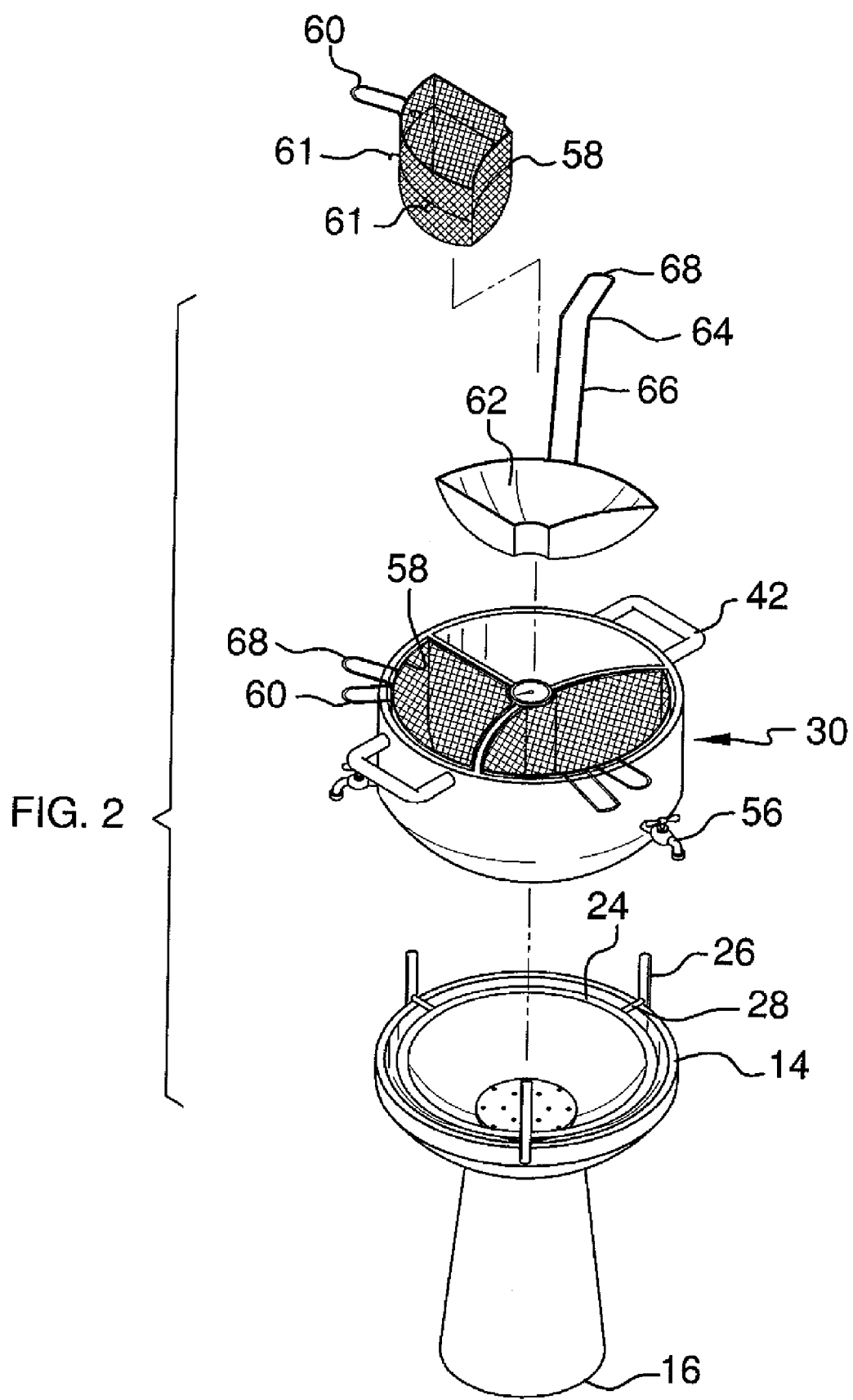
FIG. 2 is a perspective expanded view of the present invention.
Figure 3:
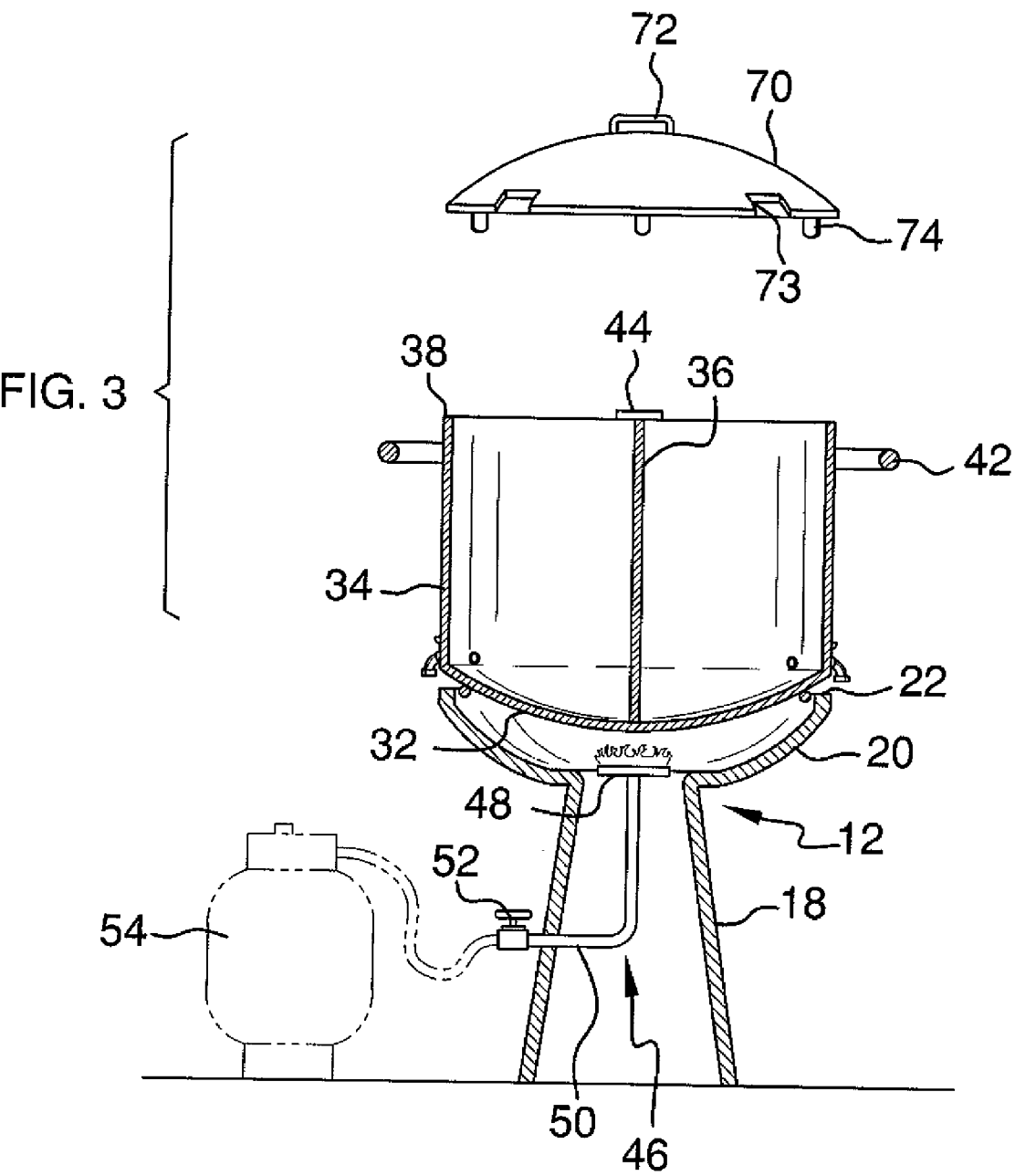
FIG. 3 is a cross-sectional view taken along line 3-3 of FIG. 1 of the present invention.
Figure 4:
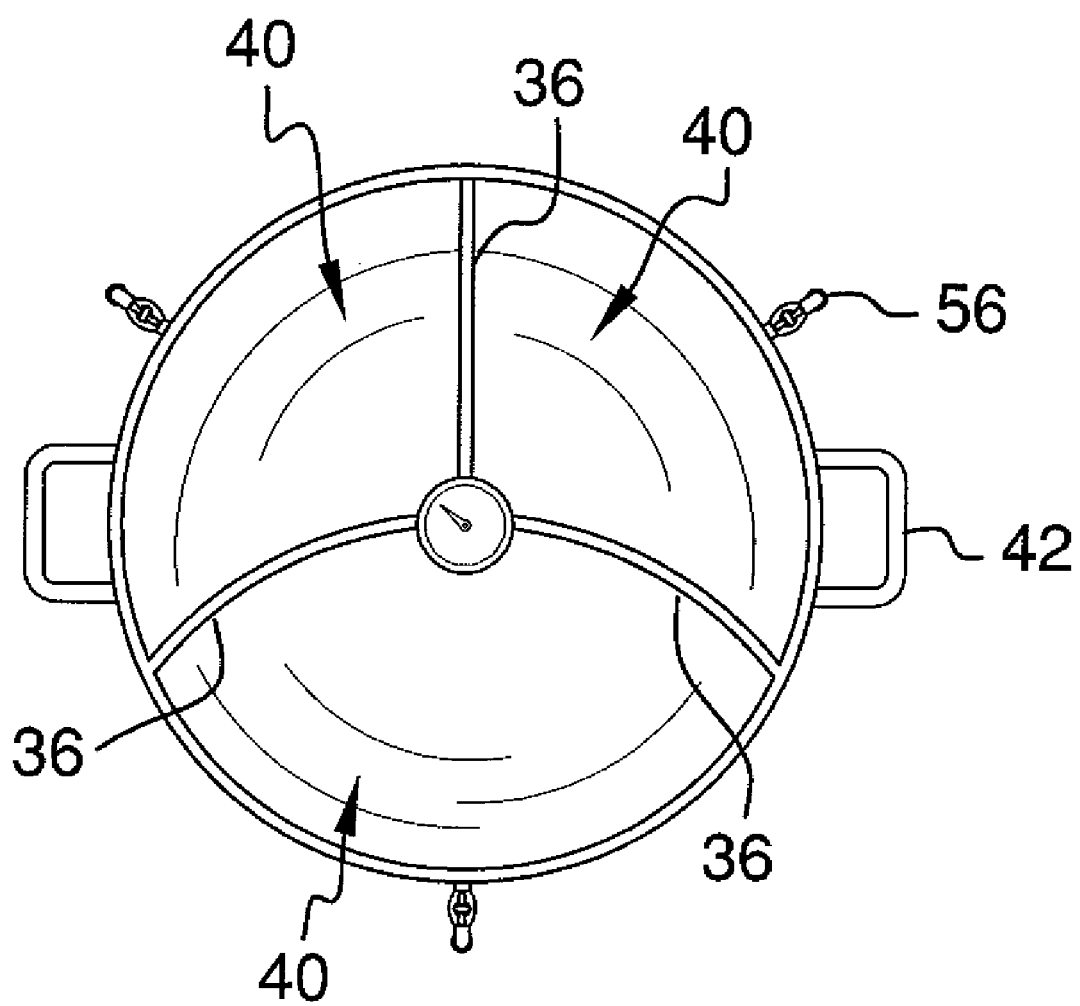
FIG. 4 is a top view of the present invention.

With reference now to the drawings, and in particular to FIGS. 1 through 4 thereof, a new oil cooking device embodying the principles and concepts of the present invention and generally designated by the reference numeral 10 will be described.

As best illustrated in FIGS. 1 through 4, the deep fryer cooking apparatus 10 generally comprises a base 12 that has an upper end 14 and a lower end 16. The lower end 16 is positionable on a support surface, such as the ground or other hard surface. The base 12 includes a vertically orientated support 18. A peripheral wall 20 is attached to and extends upwardly and outwardly from the support 18. The peripheral wall 20 is arcuate from the support 18 to an upper edge 22 of the peripheral wall 20. The upper edge 22 has a circular shape. A ring member 24 is mounted on an inner surface of the peripheral wall 20 and is positioned nearer the upper edge 22 than the support 18. The ring member 24 is spaced from the peripheral wall 20. A plurality of guides 26 is mounted on the peripheral wall 20 and each vertically extends upwardly from the perimeter wall 20. The guides 26 are positioned adjacent to the upper edge 22. The guides 26 may be attached to the ring member 24 by connecting rods 28 which are then positioned on the upper edge 22 to hold the ring member 24 and guides 26 in place.

A container 30 is provided that is configured to receive oil for deep frying. The container 30 is comprised of a metallic material, such as stainless steel. The container 30 has a bottom wall 32 and a perimeter wall 34 that is attached to and extends upwardly from the bottom wall 32. The container 30 is positioned on the upper end 14 of the base 12. The container 30 has a size and shape to be supported on the ring member 24 and contained thereon with the guides 26. The bottom wall 32 has a convex shape extending downwardly from the peripheral wall 34. A plurality of dividing walls 36 is attached to the bottom 32 and perimeter 34 walls and vertically extends from the bottom wall 32 to a position adjacent to a top edge 38 of the perimeter wall 34. The dividing walls 36 divide the container into a plurality of compartments 40. The plurality of compartments 40 is three compartments. One of the compartments 40 has a greater volume than remaining ones of the compartments 40. A pair of handholds 42 is attached to the peripheral wall 34.

A thermometer 44 is mounted in one of the dividing walls 36 and extends upwardly out of the container 30. The thermometer 44 is configured to display a temperature of oil positioned within the container 44. The thermometer 44 may include an analog or a digital thermometer.

A heating assembly 46 is attached to the base 12 and is configured to selectively heat the container 30. The heating assembly 46 includes a burner 48 mounted in the base 12 that is positioned adjacent to a juncture of the support 18 and the peripheral wall 20. A gas supply hose 50 extends through the base 12 and is fluidly coupled to the burner 48. A valve 52 is fluidly coupled to the gas supply hose 50 to allow selective opening or closing of the gas supply hose 50. A fuel supply 54, such as a propane tank, is fluidly coupled to the gas supply hose 50 to supply the burner 48 with a gaseous fuel.

A plurality of faucets 56 is provided. Each of the faucets 56 is fluidly mounted on an outer surface of the perimeter wall 34. Each of the compartments 40 has one of the faucets 56 fluidly coupled thereto. The faucets 56 may be selectively opened or closed as needed. The faucets 56 are each positioned adjacent to the bottom wall 32.

A plurality of mesh baskets 58 are provided for removing cooked items of food from the container 30. Each of the mesh baskets 58 has a size and shape approximately conforming to a size and shape of one of the compartments 40. The mesh baskets 58 include a grip 60 to facilitate removal of the mesh baskets 58 from a respective one of the compartments 40. Hooks 61 may be attached to the baskets 58 between an upper end of the baskets 58 forming the opening of the baskets and a bottom of the baskets. The hooks 61 may be positioned on the top edge 38 of the container 30 to hold the baskets 58 above any fluid in the container to allow the contents of the baskets 58 to drain.

A plurality of solid scoops 62 is also provided for removing debris from the food that has settled in the bottom of the container 30. Each of the scoops 62 has a size and shape approximately conforming to a size and shape of a lower section of each of the compartments 40. An area between a lowermost portion of the bottom wall 32 and the lowermost edge of the perimeter wall 34 defines the lower section of each of the compartments 40. Each of the scoops 62 includes an elongated handle 64 having a leg portion 66 and an arm portion 68 attached to each other at an angle. The leg portions 66 are attached to an associated one of the scoops 62 and extend to height above the perimeter wall 34 when the associated one of the scoops 62 is resting on the bottom wall 32. The arm portions 68 extend outwardly away from the container 30.

A lid 70 is provided that has a peripheral edge 71 with a shape conforming to the top edge 38 of the perimeter wall 34. The lid 70 is positioned on the top edge 38 to close the container. A hold 72 is attached to the lid 70 to assist a user in lifting the lid 70 from the container 30. The peripheral edge 71 has a plurality of notches 73 therein and positioned for receiving the handles 64 of the scoops 62 and the grips 60 of the baskets 58 when the scoops 62 and/or baskets 58 are positioned within the container 30. Stops 74 are attached to a bottom surface of the lid 70 and extend into the container 30 when the lid is positioned on the container 30 to prevent the lid from sliding off of the container 30.

In use, cooking oil is positioned within the compartments 40 to be used and the heating assembly 46 turned on to heat the oil to a desired temperature. The user of the apparatus 10 places the scoops 62 into the corresponding shaped ones of the compartments 40. The baskets 58 may then be positioned in the compartments with food therein. Once the food is cooked, the baskets 58 are removed with the food still therein. Any food debris left in the oil which was small enough to go through the mesh of the baskets 58 settles into the scoops 62. The faucets 56 are then used to drain the compartments 40 in a controlled manner so that the oil may be stored. The scoops 62 can then be removed along with the debris, which will be discarded.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cooking assembly comprising:
    a base having an upper end and a lower end, said lower end being positionable on a support surface, said base including;
        a vertically orientated support;
        a peripheral wall being attached to and extending upwardly and outwardly from said support, said peripheral wall being arcuate from said support to an upper edge of said peripheral wall, said upper edge having a circular shape;
        a ring member being mounted on an inner surface of said peripheral wall and being positioned nearer said upper edge than said support, said ring member being spaced from said peripheral wall; and
        a plurality of guides being mounted on said peripheral wall and vertically extending upwardly therefrom, said guides being positioned adjacent to said upper edge;
    a container configured to receive oil for deep frying, said container having a bottom wall and a perimeter wall being attached to and extending upwardly from said bottom wall, said container being positioned on said upper end of said base, said bottom wall having a convex shape extending downwardly from said peripheral wall, a plurality of dividing walls being attached to said bottom and perimeter walls and vertically extending from said bottom wall to a position adjacent to a top edge of said perimeter wall, said dividing walls dividing said container into a plurality of compartments, said ring member abutting said bottom wall and supporting said container;
    a heating assembly being attached to said base and being configured to selectively heat said container; and
    a plurality of mesh baskets for removing cooked items of food from the container, each of said mesh baskets having a size and shape approximately conforming to a size and shape of one of said compartments, each of said mesh baskets including a grip to facilitate removal of said mesh baskets from a respective one of said compartments.

2. The assembly according to claim 1, wherein said container has a size and shape to be supported on said ring member and contained thereon with said guides.

3. The assembly according to claim 1, wherein said plurality of compartments is three compartments.

4. The assembly according to claim 3, wherein one of said compartments has a greater volume than remaining ones of said compartments.

5. The assembly according to claim 1, further including a thermometer being mounted in one of said dividing walls and extending upwardly out of said container, said thermometer being configured to display a temperature of oil positioned within said container.

6. The assembly according to claim 1, wherein said heating assembly includes:
    a burner mounted in said base and being positioned adjacent a juncture of said support and said peripheral wall;
    a gas supply hose extending through said base and being fluidly coupled to said burner, a valve being fluidly coupled to said gas supply hose to allow selective opening or closing of said gas supply hose; and
    a fuel supply being fluidly coupled to said gas supply hose to supply said burner with a gaseous fuel.

7. The assembly according to claim 1, further including a plurality of faucets, each of said faucets being fluidly mounted on an outer surface of said perimeter wall, each of said compartments having one of said faucets fluidly coupled thereto, each of said faucets being positioned adjacent to said bottom wall.

8. The assembly according to claim 1, further including a plurality of solid scoops for removing debris settled in the container, each of said scoops having a size and shape approximately conforming to a size and shape of a lower section of each of said compartments, an area between a lowermost portion of said bottom wall and the lowermost edge of said perimeter wall defining said lower section of each of said compartments.

9. The assembly according to claim 8, wherein each of said scoops includes an elongated handle having a leg portion and an arm portion attached to each other at an angle, said leg portions being attached to an associated one of said scoops and extending to height above said perimeter wall when the associated one of said scoops is resting on said bottom wall, said arm portions extending outwardly away from said container.

10. The assembly according to claim 5, further including a plurality of faucets, each of said faucets being fluidly mounted on an outer surface of said perimeter wall, each of said compartments having one of said faucets fluidly coupled thereto, each of said faucets being positioned adjacent to said bottom wall.

11. The assembly according to claim 1, further including a plurality of hooks, each of said baskets having at least one of said hooks attached thereto, each of said hooks being positioned between an upper end and a bottom of an associated one of said baskets, said hooks being positionable on said top edge of said container to position said baskets over any fluid positioned within said container.

12. The assembly according to claim 1, further including a lid having a peripheral edge, said peripheral edge having a shape conforming to said top edge of said perimeter wall, said lid being positionable on said top edge to close said container, a hold being attached to said lid to facilitate removing said lid from said container, said peripheral edge having a plurality of notches therein, said notches being positioned to receive said grips of said baskets when said baskets are in said container.

13. The assembly according to claim 12, further including a plurality of stops each being attached to a bottom surface of said lid, said stops extending into said container when said the lid is positioned on said container, said stops inhibiting said lid from sliding off of said container.

14. A cooking assembly comprising:
  a base having an upper end and a lower end, said lower end being positionable on a support surface, said base including;
    a vertically orientated support;
    a peripheral wall being attached to and extending upwardly and outwardly from said support, said peripheral wall being arcuate from said support to an upper edge of said peripheral wall, said upper edge having a circular shape;
    a ring member being mounted on an inner surface of said peripheral wall and being positioned nearer said upper edge than said support, said ring member being spaced from said peripheral wall;
    a plurality of guides being mounted on said peripheral wall and vertically extending upwardly therefrom, said guides being positioned adjacent to said upper edge;
  a container configured to receive oil for deep frying, said container having a bottom wall and a perimeter wall being attached to and extending upwardly from said bottom wall, said container being positioned on said upper end of said base, said container having a size and shape to be supported on said ring member and contained thereon with said guides, said bottom wall having a convex shape extending downwardly from said peripheral wall, a plurality of dividing walls being attached to said bottom and perimeter walls and vertically extending from said bottom wall to a position adjacent to a top edge of said perimeter wall, said dividing walls dividing said container into a plurality of compartments, said plurality of compartments being three compartments, one of said compartments having a greater volume than remaining ones of said compartments;
  a thermometer being mounted in one of said dividing walls and extending upwardly out of said container, said thermometer being configured to display a temperature of oil positioned within said container;
  a heating assembly being attached to said base and being configured to selectively heat said container, said heating assembly including;
    a burner mounted in said base and being positioned adjacent a juncture of said support and said peripheral wall;
    a gas supply hose extending through said base and being fluidly coupled to said burner, a valve being fluidly coupled to said gas supply hose to allow selective opening or closing of said gas supply hose;
    a fuel supply being fluidly coupled to said gas supply hose to supply said burner with a gaseous fuel;
  a plurality of faucets, each of said faucets being fluidly mounted on an outer surface of said perimeter wall, each of said compartments having one of said faucets fluidly coupled thereto, each of said faucets being positioned adjacent to said bottom wall;
  a plurality of mesh baskets for removing cooked items of food from the container, each of said mesh baskets having a size and shape approximately conforming to a size and shape of one of said compartments, each of said mesh baskets including a grip to facilitate removal of said mesh baskets from a respective one of said compartments;
  a plurality of solid scoops for removing debris settled in the container, each of said scoops having a size and shape approximately conforming to a size and shape of a lower section of each of said compartments, an area between a lowermost portion of said bottom wall and the lowermost edge of said perimeter wall defining said lower section of each of said compartments, each of said scoops including an elongated handle having a leg portion and an arm portion attached to each other at an angle, said leg portions being attached to an associated one of said scoops and extending to height above said perimeter wall when the associated one of said scoops is resting on said bottom wall, said arm portions extending outwardly away from said container; and
  a pair of handholds being attached to said peripheral wall.

15. The assembly according to claim 14, further including a plurality of hooks, each of said baskets having at least one of said hooks attached thereto, each of said hooks being positioned between an upper end and a bottom of an associated one of said baskets, said hooks being positionable on said top edge of said container to position said baskets over any fluid positioned within said container.

16. The assembly according to claim 15, further including a lid having a peripheral edge, said peripheral edge having a shape conforming to said top edge of said perimeter wall, said lid being positionable on said top edge to close said container, a hold being attached to said lid to facilitate removing said lid from said container, said peripheral edge having a plurality of notches therein, said notches being positioned to receive said grips of said baskets when said baskets are in said container.

17. The assembly according to claim 16, further including a plurality of stops each being attached to a bottom surface of said lid, said stops extending into said container when said the lid is positioned on said container, said stops inhibiting said lid from sliding off of said container.

18. The assembly according to claim 17, wherein each of said compartments has an open upper side for receiving said mesh baskets.

19. The assembly according to claim 1, wherein each of said compartments has an open upper side for receiving said mesh baskets.

* * * * *